United States Patent
Martin et al.

[11] Patent Number: 6,136,418
[45] Date of Patent: Oct. 24, 2000

[54] RAPIDLY REMOVABLE THERMAL PROTECTION SYSTEM FOR REUSABLE LAUNCH VEHICLE

[75] Inventors: Anthony Martin, Long Beach, Calif.; Bevin C. McKinney, Gig Harbor, Wash.

[73] Assignee: Rotary Rocket Company, Redwood City, Calif.

[21] Appl. No.: 09/259,763

[22] Filed: Mar. 1, 1999

[51] Int. Cl.[7] ................................. B32B 3/10; B32B 3/06
[52] U.S. Cl. .......................... 428/195; 428/202; 428/215; 428/354; 244/158 A
[58] Field of Search .................................... 428/195, 202, 428/212, 354; 244/158 A

[56] References Cited

U.S. PATENT DOCUMENTS 5,842,665  12/1998  McKinney et al.

OTHER PUBLICATIONS

Rotary Rocket Company Web Page—29 pages, Mar. 16, 1999.

*Primary Examiner*—Alexander S. Thomas
*Attorney, Agent, or Firm*—Lathrop & Clark LLP

[57] ABSTRACT

A thermal protection system is composed of multiple panels, each of which has an ablative layer of cork thermal protection which is adhesively bonded to a flexible film. The rear surface of the film is coated with two types of adhesive. A first, high strength adhesive is applied at the edges of the cork panel and where aerodynamic forces may be higher. A second, lower strength adhesive is applied to the remaining surface of the film. Following the return of the launch vehicle from space, the thermal protection panels are removed by peeling away the high strength attachment edges with a knife, or other blade tool, and then removing the remainder of the panel, which is only lightly attached to the vehicle skin, without the aid of tools.

2 Claims, 1 Drawing Sheet

RAPIDLY REMOVABLE THERMAL PROTECTION SYSTEM FOR REUSABLE LAUNCH VEHICLE

CROSS REFERENCES TO RELATED APPLICATIONS

Statement as to Rights to Inventions Made Under Federally Sponsored Research and Development

BACKGROUND OF THE INVENTION

The present invention relates to thermal protection systems for launch vehicles in general, and to such systems for reusable launch vehicles in particular.

When a launch vehicle returns to the Earth's atmosphere from an orbital or suborbital path, the skin of the vehicle is subjected to atmospheric drag resulting in the application of thermal loads to the exterior of the vehicle. Expendable launch vehicles, that is launch vehicles which are used only once, may employ ablative coatings or heat shields which are consumed on vehicle re-entry. Reusable space vehicles, such as the United States Space Shuttle, achieve thermal protection by the use of costly tiles and blankets. Although the reusable tile and blanket thermal system is not consumed on reentry, it may be damaged and hence must be carefully inspected and maintained after each flight. This process is time-consuming and costly.

What is needed is a thermal protection system for a reusable launch vehicle which is protective of the vehicle during re-entry, but which is readily removed and replaced for rapid turnaround and ready launch.

SUMMARY OF THE INVENTION

The thermal protection system of this invention has an ablative layer of cork thermal protection which is adhesive bonded to a flexible film. The rear surface of the film is coated with two types of adhesive. A first, high strength adhesive is applied at the edges of the cork panel and where aerodynamic forces may be higher. A second, lower strength adhesive is applied to the remaining surface of the film. Following the return of the launch vehicle from space, the thermal protection panels are removed by peeling away the high strength attachment edges with a knife, or other blade tool, and then removing the remainder of the panel which is only lightly attached to the vehicle skin without the aid of tools.

It is an object of the present invention to provide a launch vehicle with an ablative thermal protection system which is rapidly removed and replaced.

It is another object of the present invention to provide an ablative thermal protection system for a launch vehicle which is prepared in modular panels and which is rapidly attached to the vehicle skin.

It is also an object of the present invention to provide an economical replaceable thermal protection system for a reusable launch vehicle.

Further objects, features and advantages of the invention will be apparent from the following detailed description when taken in conjunction with the accompanying drawings.

DESCRIPTION OF THE PREFERRED EMBODIMENTS

Figure 1:
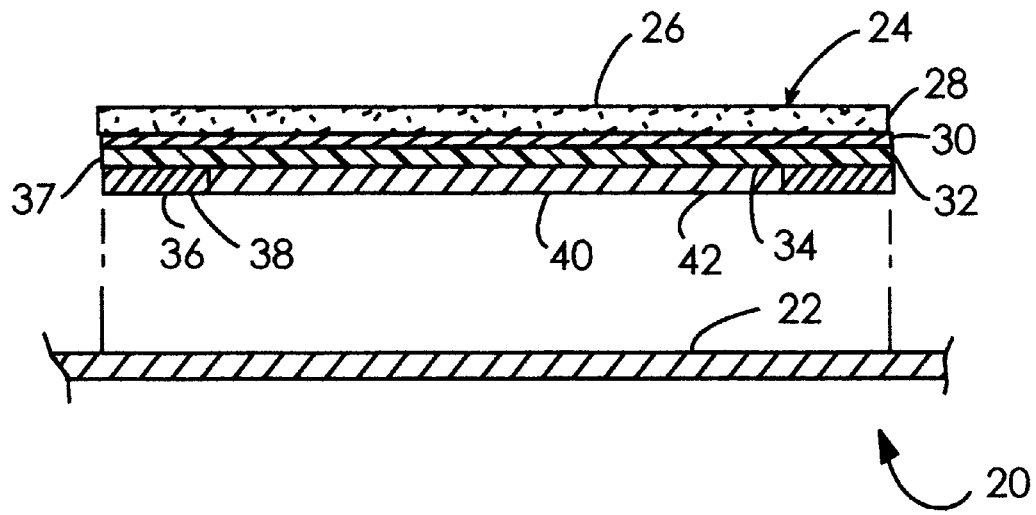
FIG. 1 is an exploded cross-sectional view of a thermal protection panel in relation to the exterior skin of a launch vehicle, not shown to scale.
Figure 2:
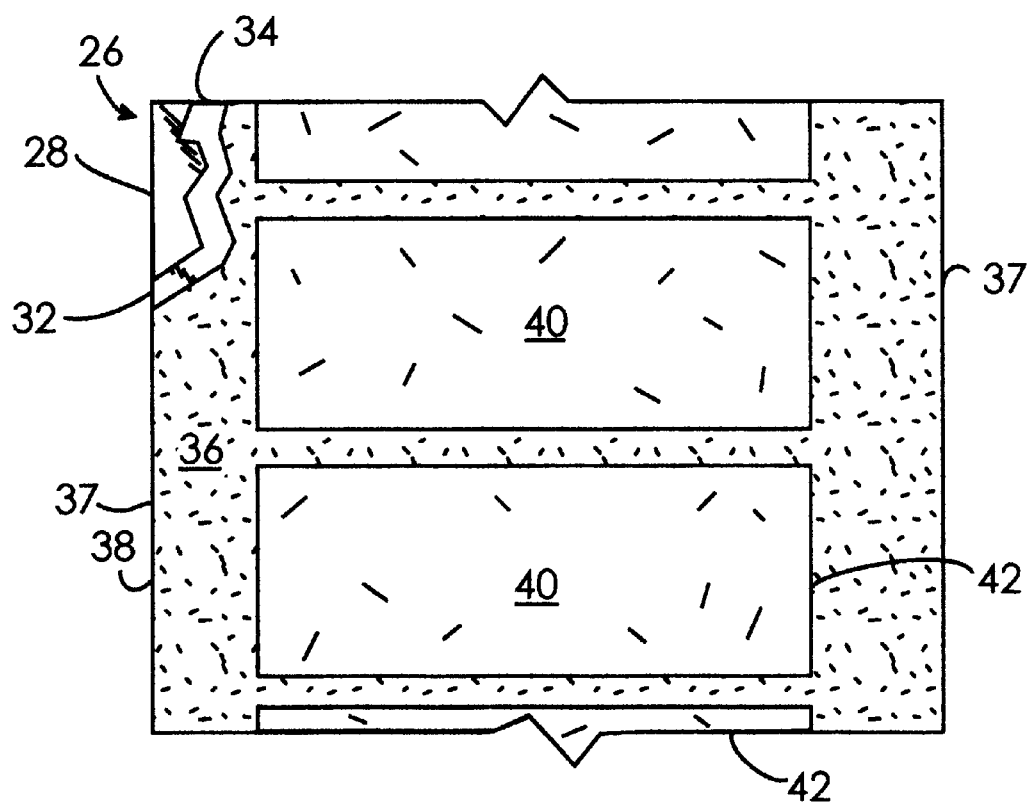
FIG. 2 is a bottom fragmentary plan view of the thermal protection panel of FIG. 1, partially broken away in section.

Referring more particularly to FIGS. 1–2, wherein like numbers refer to similar parts, as shown in FIG. 1, a reusable launch vehicle 20 has an exterior outwardly facing skin 22 which typically will be formed of metal, carbon fiber, or a composite system. Typically, the launch vehicle skin will be selected primarily for its strength, in order to minimize vehicle weight, with thermal properties a secondary consideration. A launch vehicle returning to Earth after delivering a payload to orbit will be traveling many thousands of miles per hour when it encounters the Earth's atmosphere. The friction produced generates heat which must be dissipated if the vehicle skin is to be preserved.

The vehicle skin is protected by an applied thermal protection system 24, shown in FIG. 2. The thermal protection system 24 is preferably fabricated as an assembly of a number of panels 26 which are readily applied to the launch vehicle skin 22. Each panel 26 has a thermal protection layer composed of an ablative material, preferably cork 28. As shown in FIG. 1, the cork 28 is attached by an adhesive 30 to a flexible film 32 which allows the cork to be bent to conform to the surface geometry of the vehicle skin 22. The flexible film 32 has a rear surface 34 which faces the vehicle skin 22. A first adhesive 36 is applied to peripheral regions 38 of the panel 26 which extend inwardly from the edges 37 of the panel. The first adhesive 36 is a high strength adhesive which is selected to securely attach the panel to the vehicle skin 22. However, the surface area of the peripheral regions 38 is no greater than that needed to retain the thermal protection system under the loads to be encountered on re-entry. Intermediate regions 40 of the film 32 are defined by those portions of the rearwardly facing surface 34 which are not covered by the first adhesive 36. The intermediate regions 40 have a second adhesive 42 applied thereto. The second adhesive 42 is a lighter strength adhesive than the first adhesive 36. The second adhesive 42 contributes to retaining the panel 26 adhered to the vehicle skin 22, however, the second adhesive is of sufficiently low peel strength, that it may readily be removed from the vehicle skin once the peripheral regions 38 have been disengaged.

The economic use of a reusable launch vehicle calls for the rapid turnaround and refurbishment of the vehicle after each flight. The effective cost of each launch is lowered when the same vehicle may be used many times. The thermal protection system of this invention is sacrificed on re-entry to protect the launch vehicle. Hence, it may not be used for a second launch. To prepare the launch vehicle for reuse, the remaining remnants of the thermal protection system panels must be completely removed from the vehicle skin 22 and a new assembly of panels applied.

The old panels 26 are removed by engaging a bladed instrument, for example a putty knife, or the like, under the edge of the film 32 and mechanically separating the film from the vehicle skin. Once the relatively narrow peripheral region 38 has been separated from the vehicle skin, the operator may grip the free edge and peel away the entire panel due to the generally light attachment of the intermediate regions 40. Because the operator does not need to use a tool to remove every square inch of the panel 26, the operation is greatly accelerated.

It should be noted that the first adhesive may be applied to interior portions of the panel not adjacent to a panel edge, in those areas where it has been determined that aerodynamic forces will be particularly high.

It is understood that the invention is not limited to the particular construction and arrangement of parts herein illustrated and described, but embraces such modified forms thereof as come within the scope of the following claims.

We claim:

1. A thermal protection system for a reusable launch vehicle comprising:

an ablative thermal protection layer;

a flexible film adhesively attached to the thermal protection layer, the film having a rearwardly facing surface and a peripheral edge;

a first adhesive applied to peripheral regions of the rearwardly facing surface of the flexible film, the first adhesive having an adhesive strength sufficient to retain the film on a vehicle skin; and a second adhesive applied to the flexible film in regions to which the first adhesive is not applied, the second adhesive being of substantially lower adhesive strength than the first adhesive.

2. A thermal protection panel forming a part of a thermal protection system on a reusable launch vehicle, the thermal protection panel comprising:

an ablative thermal protection layer;

a flexible film adhesively attached to the thermal protection layer, the film having a rearwardly facing surface and a peripheral edge;

a first adhesive applied to peripheral regions of the rearwardly facing surface of the flexible film, the first adhesive having an adhesive strength sufficient to retain the film on a vehicle skin; and a second adhesive applied to the flexible film in regions to which the first adhesive is not applied, the second adhesive being of substantially lower adhesive strength than the first adhesive.

* * * * *